(12) United States Patent
Uemura

(10) Patent No.: US 10,212,353 B2
(45) Date of Patent: Feb. 19, 2019

(54) DISPLAY CONTROL APPARATUS AND METHOD OF CONTROLLING DISPLAY CONTROL APPARATUS

(71) Applicant: CANON KABUSHIKI KAISHA, Tokyo (JP)

(72) Inventor: Hidetaka Uemura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/786,271

(22) Filed: Oct. 17, 2017

(65) Prior Publication Data
US 2018/0106982 A1 Apr. 19, 2018

(30) Foreign Application Priority Data
Oct. 19, 2016 (JP) .................. 2016-204807

(51) Int. Cl.
*H04N 5/232* (2006.01)
*H04N 13/20* (2018.01)
*G03B 13/36* (2006.01)

(52) U.S. Cl.
CPC . *H04N 5/232939* (2018.08); *H04N 5/232127* (2018.08); *H04N 5/232933* (2018.08); *H04N 13/20* (2018.05); *G03B 13/36* (2013.01)

(58) Field of Classification Search
CPC ......... H04N 5/23212; H04N 5/232127; H04N 5/23293; H04N 5/232933; H04N 5/232939
See application file for complete search history.

(56) References Cited

U.S. PATENT DOCUMENTS

2004/0218086 A1* 11/2004 Voss .................. H04N 5/23212
348/345
2016/0344937 A1 11/2016 Iwashita
2017/0223275 A1* 8/2017 Yanagisawa ....... H04N 5/23212

FOREIGN PATENT DOCUMENTS

JP 2007-329784 A 12/2007
JP 2011-077900 A 4/2011
JP 2012-199986 A 10/2012

* cited by examiner

*Primary Examiner* — Daniel M Pasiewicz
(74) *Attorney, Agent, or Firm* — Canon USA Inc., IP Division

(57) ABSTRACT

An image pickup element performs photoelectric conversion on an optical image formed by an interchangeable lens. A ranging unit measures a distance to each object from signals for detecting a phase difference from the image pickup element. A body microcomputer calculates a de-focusing amount of each object, generates a focus guide for each object with a size or a (detailed or simple) content according to the de-focusing amount, and displays the focus guide on a display unit in a superimposed manner on an image captured by the image pickup element. A user adjusts the focus of the interchangeable lens using a focus ring by referring to the screen of the display unit.

14 Claims, 7 Drawing Sheets

FIG. 2A

| R  | Gr | R  | Gr | R  | Gr | R  |
|----|----|----|----|----|----|----|
| Gb | B  | Gb | B  | Gb | B  | Gb |

FIG. 2B

| R A | R B | Gr A | Gr B | R A | R B | Gr A | Gr B | R A | R B | Gr A | Gr B | R A | R B |
|-----|-----|------|------|-----|-----|------|------|-----|-----|------|------|-----|-----|
| Gb A | Gb B | B A | B B | Gb A | Gb B | B A | B B | Gb A | Gb B | B A | B B | Gb A | Gb B |

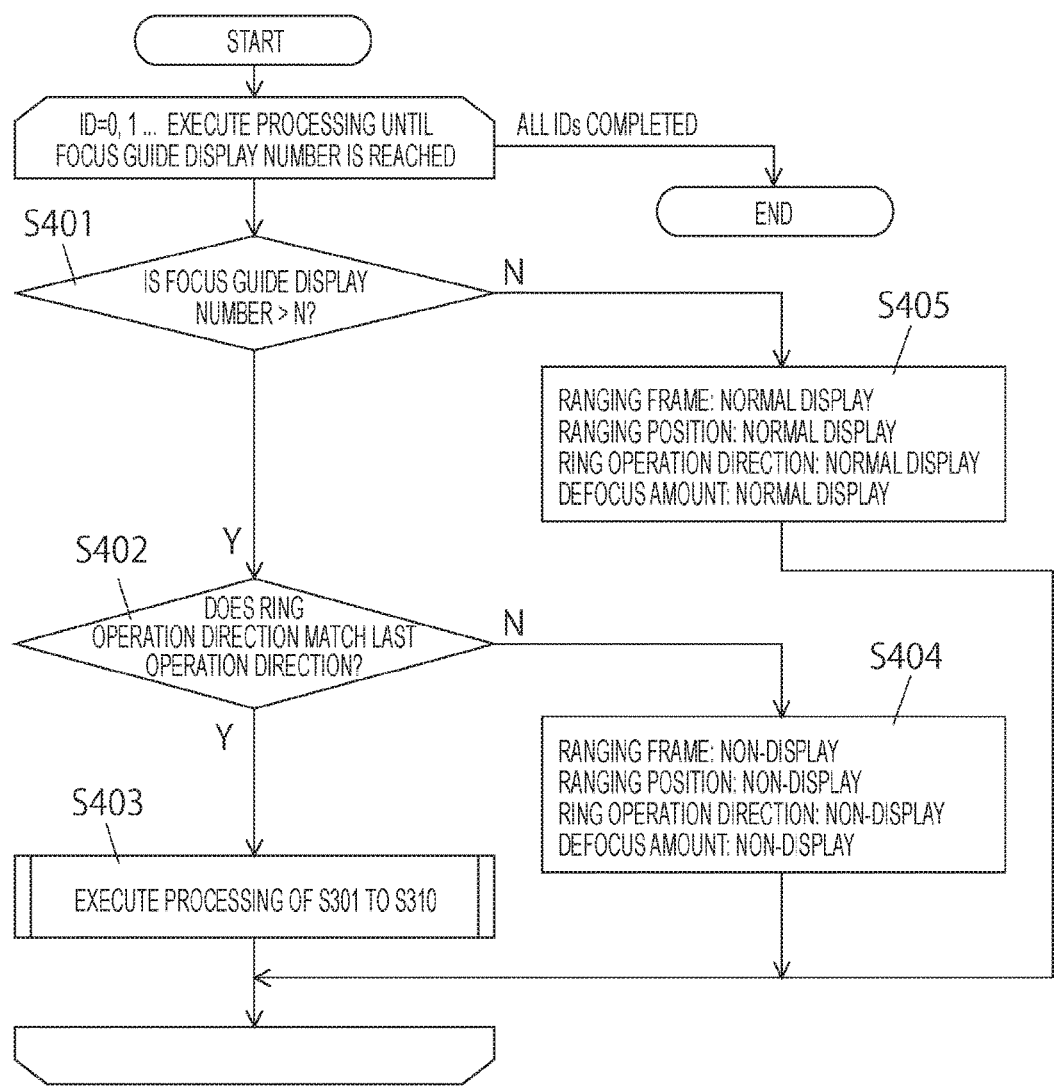

DISPLAY CONTROL APPARATUS AND METHOD OF CONTROLLING DISPLAY CONTROL APPARATUS

BACKGROUND

Field

The present invention relates to a display control apparatus that displays a focusing degree of an object when an image captured by an image pickup apparatus having a focus adjustment function is displayed, and a method of controlling the display control apparatus.

Description of the Related Art

It is a publicly-known technique that in an image pickup apparatus, a focus evaluation value of an object is calculated by a dedicated ranging sensor or a plurality of image sensors, and a front focus/rear focus state or a deviation degree of focusing the object is displayed based on the evaluation value. Such a display function is called a focus assist function.

Japanese Patent Laid-Open No. 2011-077900 discloses an image pickup apparatus in which face frames blurred according to the focusing states of the faces of persons within a photographing field of view are additionally displayed to inform a user of the de-focusing amount (i.e. the degree of defocus, or a measure of how defocused it is, or how far it is from being in focus) of each object.

Japanese Patent Laid-Open No. 2007-329784 discloses an image pickup apparatus that performs the following control so as to easily perform a manual focus operation on an arbitrary face among a plurality of detected faces. First, a face icon for a focused face is displayed blinking, while focal point information and a plurality of face icons are displayed on a distance indicator. Second, a plurality of face frames (corresponding to face icons) is displayed on a live view, and the face frame for the focused face is displayed blinking. Third, distance information is displayed at the positions of the respective face frames.

In recent years, a technique for selecting a plurality of arbitrary objects within a photographing field of view as ranging targets has been employed. For example, an arbitrarily designated area within the photographing field of view is set as a focus evaluation value detection area, and the designated area and a ranging frame are displayed in a superimposed manner. Then, distance information about the objects within the focus evaluation value detection area is acquired and displayed. This technique makes it possible to more accurately display a change in the focusing state in association with a focus deviation amount and a focal shift with respect to the focusing state. In addition, a focus guide display can be performed by an annular display in an operation direction of a focus operation ring based on the distance and ranging position of each object.

SUMMARY OF THE INVENTION

The present invention has been made in consideration of the aforementioned problems, and realizes a technique capable of appropriately providing a user with a focus guide without impairing the visibility.

In order to solve the aforementioned problems, one aspect of the present invention provides a display control apparatus including: an acquisition unit configured to acquire information about a focusing degree of a plurality of focal point detection areas; and a display control unit configured to control each of the plurality of focal point detection areas to display a focus guide indicating a plurality of pieces of information including the focusing degree in a superimposed manner on a live view image captured by an image pickup unit. The display control unit performs the control to perform a simple display by displaying a focus guide corresponding to a focal point detection area having a low focusing degree to be smaller than a focus guide corresponding to a focal point detection area having a high focusing degree, or by not displaying at least one of the plurality of pieces of information in the focus guide corresponding to the focal point detection area having the low focusing degree.

According to the present invention, it is possible to appropriately provide a user with a focus guide without impairing visibility.

Further features of the present invention will become apparent from the following description of exemplary embodiments with reference to the attached drawings.

The accompanying drawings, which are incorporated in and constitute a part of the specification, illustrate embodiments of the invention, and together with the description, serve to explain the principles of the invention.

BRIEF DESCRIPTION OF THE DRAWINGS

FIGS. 2A and 2B are pixel configuration examples of a light receiving surface of an image pickup element.

FIG. 4 is a flowchart illustrating the focus guide display change processing.

DESCRIPTION OF THE EMBODIMENTS

Exemplary embodiments of the present invention will be described in detail below with reference to the drawings. Note that the present invention is not limited to the following exemplary embodiments, but instead may be applied to a single-lens reflex camera, a lens integrated compact camera, or a camera function-equipped mobile phone.

First Exemplary Embodiment

Figure 1:
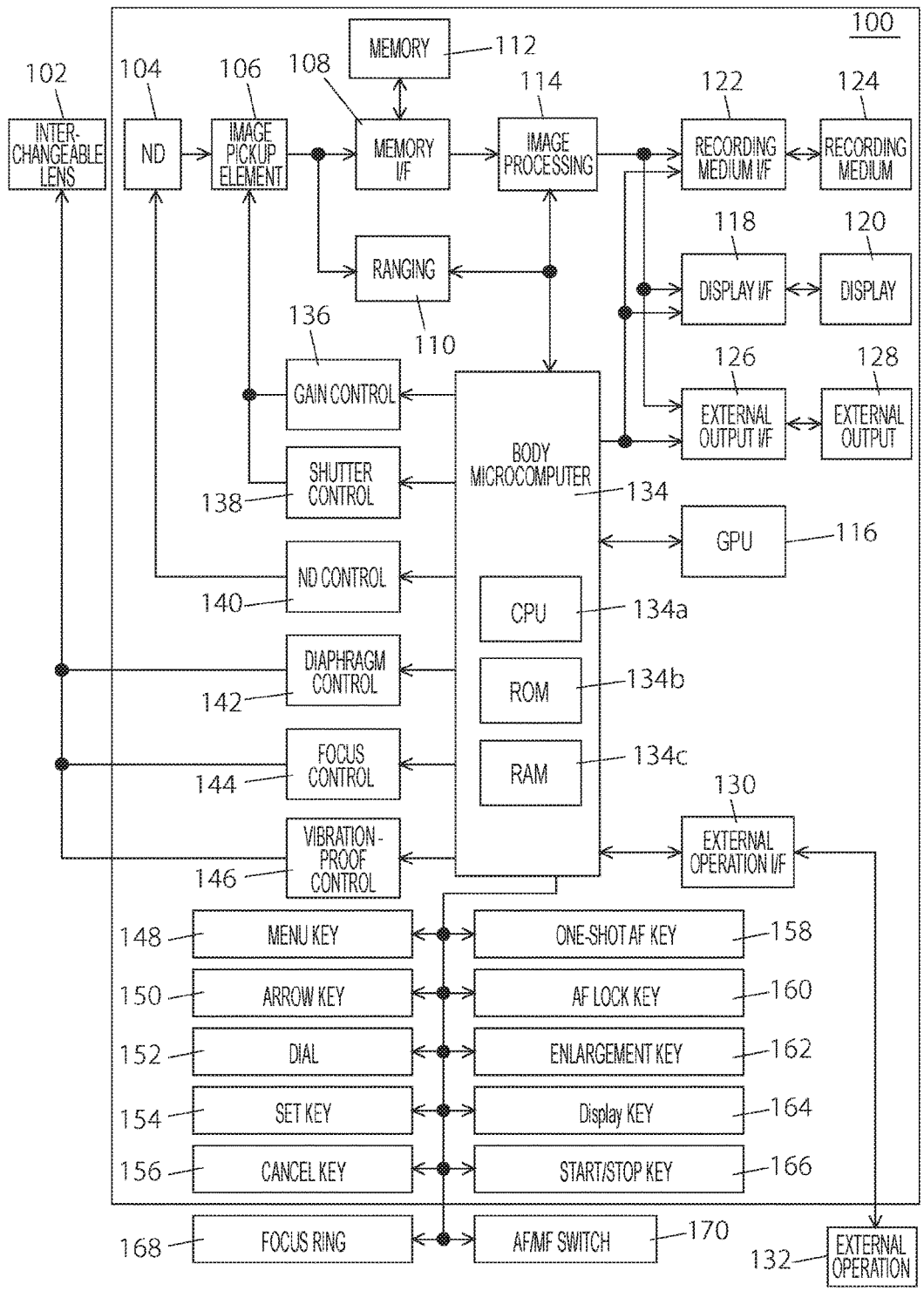
FIG. 1 is a schematic configuration block diagram of a camera.

FIG. 1 is a schematic configuration block diagram of a lens interchangeable digital video camera as an image pickup apparatus to which an exemplary embodiment of a display control apparatus according to the present invention is applied. Each functional block may be implemented by hardware such as an ASIC or a programmable logic array (PLA), or may be implemented in such a manner that a programmable processor such as a CPU or an MPU executes software. Each functional block may also be implemented by a combination of software and hardware. Accordingly, in the following description, even when different functional blocks are described as operation subjects, the functional blocks can be implemented by the same hardware as the subject.

The camera illustrated in FIG. 1 includes a camera body 100 and an interchangeable lens 102 that is detachably mounted on the camera body 100. On the surface of the camera body 100, various operation units, a display unit 120, and an external output unit 128 are exposed.

The interchangeable lens 102 is a photographing lens which is composed of a group of a plurality of lenses, such as a focus lens, a zoom lens, and a shift lens, and a diaphragm. An object optical image formed by an interchangeable lens 102 is incident on an image pickup element 106 through an ND filter 104. The ND filter 104 is disposed so as to reduce or adjust the amount of light incident on the image pickup element 106.

The image pickup element 106 has a configuration in which a plurality of pixels each including a photoelectric conversion element is two-dimensionally arranged. The image pickup element 106 performs photoelectric conversion on the object optical image, which is formed by the interchangeable lens 102, in each pixel, and an A/D conversion circuit performs an analog-to-digital conversion on the image and outputs a captured image signal (RAW image data) for each pixel to each of a memory I/F unit 108 and a ranging unit 110.

The memory I/F unit 108 writes the RAW image data for all pixels output from the image pickup element 106 into a memory 112, and reads out the RAW image data retained in the memory 112 and outputs the RAW image data to an image processing unit 114. The memory 112 has a capacity capable of storing the RAW image data for all pixels of several frames.

The image processing unit 114 performs image processing necessary for control on the RAW image data for all pixels sent from the memory I/F unit 108. Specifically, the image processing unit 114 corrects a level difference due to the image pickup element 106. For example, the image processing unit 114 performs correction of a pixel signal level of an effective area by using a pixel signal of an OB area located outside the effective area of the image pickup element 106, and performs correction of a defective pixel by using peripheral pixels. The image processing unit 114 also performs processing such as correction of light falloff at edges, color correction, contour emphasis, noise reduction, gamma correction, debayer, and compression. The image processing unit 114 performs the above-mentioned processing on the RAW image data input from the image pickup element 106, and outputs the processed captured image data in a predetermined video image format.

A graphics processing unit (GPU) 116 is a rendering engine for rendering various information and a menu screen in a VRAM. The GPU 116 has a function of rendering character strings and graphics, an enlargement/reduction rendering function, a rotation rendering function, and a layer synthesis function. The VRAM includes an alpha channel representing a transmittance. A display I/F unit 118 superimposes the image data from the image processing unit 114 and the character strings, graphics, and the like on the VRAM that are rendered by the GPU 116, performs resize processing, and outputs the processed data to the display unit 120. The display unit 120 is used as a monitor or a finder for displaying the image data output from the display I/F unit 118 so as to check an angle of view.

For example, when an enlargement display mode is effective, the display I/F unit 118 performs superimposing processing and resize processing on a partial area of the data according to a control signal from a body microcomputer 134. As a result, in the enlargement display mode, an image larger than that during a normal mode is displayed on the display unit 120. In this state, a photographer can perform a manual focus adjustment more accurately.

A recording medium I/F unit 122 is an interface for reading data from a recording medium 124 and writing data thereinto. The recording medium I/F unit 122 can write the image data output from the image processing unit 114 into the recording medium 124, and can read out the image data recorded on the recording medium 124 from the recording medium 124. The recording medium 124 is a memory card or the like which is composed of a semiconductor memory or the like having a capacity capable of recording a plurality of items of image data or moving image data.

An external output I/F unit 126 has a function of resizing the moving image data from the image processing unit 114 depending on an output destination. The external output I/F unit 126 further performs signal conversion suitable for the specifications of the external output unit 128 and applies a control signal, and outputs the image data in the format of the converted moving image to the external output unit 128. The external output unit 128 is a terminal for outputting the moving image data to the outside, such as an SDI terminal or an HDMI® terminal. The external output unit 128 is connectable to a monitor display and an external recording device.

An external operation I/F unit 130 is an interface that receives a control instruction from an external operation unit 132, and notifies the body microcomputer 134 of the control instruction. The external operation I/F unit 130 is, for example, an infrared remote-control light receiving unit, a wireless LAN interface, or LANC®.

The body microcomputer 134 includes a CPU 134a, a ROM 134b, and an RAM 134c. The CPU 134a develops a program stored in the ROM 134b in the work area of the RAM 134c, and executes the program, thereby controlling the overall operation. The body microcomputer 134 executes a program stored in the ROM 134b, thereby implementing each processing described below. The CPU 134a develops constants and variables for the operation of the body microcomputer 134, the program read out from the ROM 134b, and the like in the RAM 134c.

A gain control unit 136, a shutter control unit 138, an ND control unit 140, and a diaphragm control unit 142 are each used for exposure control. The gain control unit 136 controls the gain of the image pickup element 106. The shutter control unit 138 controls the shutter speed of the image pickup element 106. The ND control unit 140 controls the amount of light transmitting through the ND filter 104. The diaphragm control unit 142 controls the diaphragm of the interchangeable lens 102. The body microcomputer 134 controls the control units 136, 138, 140, and 142 based on the result of a calculation from the luminance level of the output image data from the image processing unit 114 and operation parameters manually set by the photographer.

A focus control unit 144 performs different operations depending on a focus drive mode, i.e., an auto focus (AF) mode or a manual focus (MF) mode, which is set by the body microcomputer 134.

In the AF mode, the body microcomputer 134 calculates focusing information about the focus by referring to the output image data from the image processing unit 114, and controls the focus lens of the interchangeable lens 102 through the focus control unit 144 based on the calculation result. The body microcomputer 134 can set an AF frame in a partial area within the photographing field of view, and can calculate the focusing information about the focus based only on objects within the AF frame. The AF mode further includes a one-shot AF mode and a continuous AF mode.

The one-shot AF mode is a mode in which the body microcomputer 134 performs AF control only when a one-shot AF key 158 is pressed and the control of the focus control unit 144 is interrupted after focusing success or focusing failure is determined. The continuous AF mode is a mode in which the AF control is continuously performed. In the continuous AF mode, however, if an AF lock state is set by pressing an AF lock key 160, the body microcomputer 134 interrupts the focus control by the focus control unit 144. A user can switch the AF mode between the one-shot AF mode and the continuous AF mode in the menu screen.

In the MF mode, the body microcomputer 134 interrupts the focus control of the focus control unit 144 based on the output image data from the image processing unit 114. Alternatively, the body microcomputer 134 controls the position of the focusing lens through the focus control unit 144 according to a rotation operation, which is performed by the photographer, of a focus ring 168 that is incorporated in the interchangeable lens 102 by the photographer.

A vibration-proof control unit 146 controls the shift lens of the interchangeable lens 102 so as to offset a camera shake. The body microcomputer 134 calculates a motion vector for each object by referring to the output image data from the image processing unit 114, and supplies the calculated motion vector to the vibration-proof control unit 146. The vibration-proof control unit 146 controls the shift lens of the interchangeable lens 102 to offset a camera shake according to the motion vector from the body microcomputer 134. Thus, the camera shake is optically suppressed. In place of the optical vibration-proof processing of the vibration-proof control unit 146, electronic vibration-proof processing in which a partial image at a position where an image blur due to a camera shake is offset is clipped from captured image data on the memory storing the captured image data may be employed.

A menu key 148 is used to input, to the body microcomputer 134, an instruction to display the menu screen on the display unit 120, and an instruction to close the open menu screen.

An arrow key 150 and a dial 152 are used to input, to the body microcomputer 134, an instruction to move a cursor for selecting an item in the menu screen, or to move the frame display about the focus in a direction desired by the photographer.

A SET key 154 is used to input, to the body microcomputer 134, an instruction to select the item pointed by the cursor in the menu screen, or to determine various setting operations.

A cancel key 156 is used to input, to the body microcomputer 134, an instruction to return to the previous layer when the deepest layer is selected on the menu screen, or to cancel various setting operations.

The one-shot AF key 158 is used to input, to the body microcomputer 134, an instruction to cause the focus control unit 144 to drive the AF when the one-shot AF mode is set as the AF mode.

The AF lock key 160 is used to input, to the body microcomputer 134, an instruction to interrupt the control of the focus control unit 144, or to release the control interrupted state, when the continuous AF mode is set as the AF mode.

An enlargement key 162 is used to input, to the body microcomputer 134, an instruction to enlarge or restore a video image displayed on the display unit 120.

A DISPLAY key 164 is used to input, to the body microcomputer 134, an instruction to change a Disp level retained in the body microcomputer 134. Based on the selected Disp level, the body microcomputer 134 limits various information displays displayed on the display unit 120, displays more detailed information, and displays the video image more clearly.

A START/STOP key 166 is used to input, to the body microcomputer 134, an instruction to start and stop recording by the recording medium I/F unit 122.

The focus ring 168 is used to input, to the body microcomputer 134, an instruction to move the focus lens in the interchangeable lens 102 when the MF is set as the focus drive state. Thus, the focus can be adjusted by a manual operation.

An AF/MF switch 170 is used to input, to the body microcomputer 134, an instruction to switch the focus drive state, i.e., AF or MF.

The operation members 148 to 170 are composed of members such as a key (button), a dial, a tact switch, or a ring. Each operation member accepts an operation from the photographer, and supplies the body microcomputer 134 with a predetermined instruction based on the operation. The operation members 148 to 166 are assembled to the camera body 100, and the focus ring 168 and the AF/MF switch 170 are assembled to the interchangeable lens 102. Some of the operation members 148 to 170 can exchange the roles of keys, or can be assigned other functions by setting in the menu screen.

The external operation unit 132 is an operation unit that inputs various instructions to the body microcomputer 134 through the external operation I/F unit 130 according to a user operation. The user can input operation signals similar to those of the operations of the operation members 148 to 170 to the body microcomputer 134 by using the external operation unit 132, and can also input an operation instruction for the menu screen displayed on the display unit 120 to the body microcomputer 134.

Referring to FIGS. 2A and 2B, the pixel arrangement on the light receiving surface or the image pickup area of the image pickup element 106 will be described. FIG. 2A illustrates the pixel arrangement of the image pickup element having no image pickup area phase difference detection function. The pixel arrangement illustrated in FIG. 2A is an example of a Bayer arrangement of red (R), blue (B), and green (Gb, Gr). FIG. 2B illustrates the pixel arrangement of the image pickup element 106 having the image pickup area phase difference detection function. The pixel arrangement illustrated in FIG. 2B corresponds to a color filter arrangement which is the same as the example illustrated in FIG. 2A.

As illustrated in FIG. 2B, each pixel of the image pickup element 106 retains two photodiodes (light receiving elements) for one microlens so as to enable an image pickup area phase difference AF. In the image pickup area of the image pickup element 106, the pixels of the light receiving element structure are two-dimensionally disposed in the image pickup area corresponding to the color filter arrangement which is the same as the example illustrated in FIG. 2A. Thus, each pixel can receive two light fluxes which are obtained by dividing the exit pupil of the interchangeable lens 102. In the following description, an output signal from one of the two light receiving elements constituting one pixel is referred to as an A-image signal, and an output signal from the other one of the light receiving elements is referred to as a B-image signal. The image pickup element 106 outputs, to the ranging unit 110, two signals (A-image signal and B-image signal) for detecting a phase difference from each pixel, and outputs, to the memory I/F unit 108, image signals (A-image signal+B-image signal) obtained by adding the signals from two photodiodes for recording. The image signals output from the image pickup element 106 to the memory I/F unit 108 are equivalent to the image signals output from the image pickup element in the Bayer arrangement illustrated in FIG. 2A.

The ranging unit 110 performs a correlation operation on the A-image signal and the B-image signal output from the image pickup element 106, calculates information about the de-focusing amount and various reliabilities, and outputs the calculation result to the body microcomputer 134.

In this case, the image pickup element 106 outputs three signals, i.e., the recording image signal and the two image signals for detecting a phase difference. However, the output form is not limited to this form. For example, the recording image signal and one of the two image signals for the phase difference AF may be output. The contents of image signals that are not output may be obtained by a calculation using the image signal for recording and the output image signal.

An example in which each of the pixels disposed in an array is composed of two photodiodes on which a light flux from one microlens is incident has been described above. However, each of the pixels may be composed of three or more photodiodes. Alternatively, a pixel structure including a plurality of pixels indicating different aperture positions of a light receiving unit for a microlens may be employed. That is, any pixel structure may be employed, as long as two image signals, i.e., the A-image signal and the B-image signal, for detecting a phase difference can be obtained.

Figure 3:
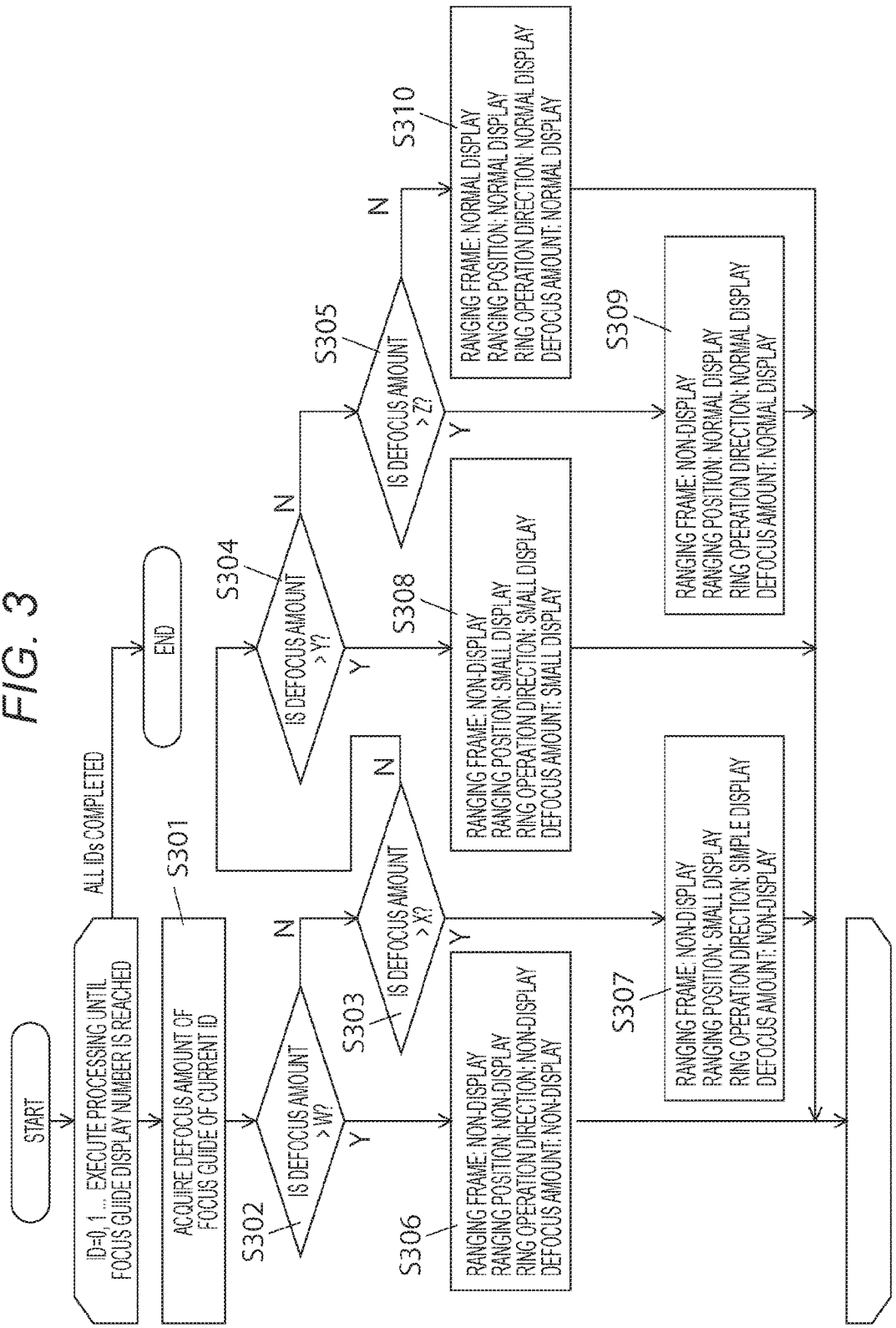
FIG. 3 is a flowchart illustrating focus guide display change processing.

FIG. 3 is a flowchart illustrating focus guide display change processing according to the present exemplary embodiment. A control program corresponding to the processing illustrated in FIG. 3 is stored in the ROM 134*b* of the body microcomputer 134. The CPU 134*a* of the body microcomputer 134 reads out the control program from the ROM 134*b*, and develops and executes the control program in the RAM 134*c*, thereby implementing the processing illustrated in FIG. 3. The CPU 134*a* generates a focus guide for each object, manages the focus guides using IDs unique to the respective focus guides, and executes the processing illustrated in FIG. 3 in a loop so that the processing is applied to all the focus guides currently displayed. As illustrated by way of example, each focus guide includes a ranging frame indicating a ranging area, a ranging position indicating coordinates or an object on which the focus guide is performed, an operation direction (ring operation direction) of the focus ring 168 for focusing, and a de-focusing amount indicating a deviation amount of the focus. The ring operation direction is a direction determined depending on a front focus state, a rear focus state, or a focusing state. Accordingly, the user can identify the front focus state, the rear focus state, or the focusing state based on the ring operation direction. The de-focusing amount may be displayed differently depending on the front focus state or the rear focus state. Alternatively, since the front focus state and the rear focus state can be identified based on the ring operation direction, only the absolute value of the de-focusing amount may be displayed.

In step S301, the body microcomputer 134 acquires or calculates information about the de-focusing amount, the ranging frame, and the object in the focus guide of the ID currently selected. In steps S302 to S305, the acquired de-focusing amount is determined. It is determined whether or not the de-focusing amount is equal to or more than a threshold. Assume in steps S302 to S305 that it is determined whether or not the absolute value of the de-focusing amount is equal to or more than a threshold. Specifically, when the threshold is $\alpha$, it is determined whether the de-focusing amount $>\alpha$, or the de-focusing amount $<-\alpha$. Note that when the de-focusing amount is close to 0, it indicates the focusing state; when the de-focusing amount is a positive value, it indicates the front focus state; and when the de-focusing amount is a negative value, it indicates the rear focus state. In this manner, the ring operation direction can be determined. Further, in the present exemplary embodiment, the ranging frame has a fixed size, and thus only the information about the position may be acquired.

In step S302, the body microcomputer 134 determines whether or not the de-focusing amount acquired in step S301 is a value that is equal to or greater than a threshold W. When it is determined that the de-focusing amount acquired in step S301 is a value that is equal to or greater than the threshold W, the body microcomputer 134 proceeds the processing to step S306. When it is determined that the de-focusing amount acquired in step S301 is a value that is not equal to or greater (i.e. less) than the threshold W, the body microcomputer 134 proceeds the processing to step S303.

In step S306, the body microcomputer 134 does not display the ranging frame, the ranging position, the ring operation direction, and the de-focusing amount in the focus guide of the ID currently selected. The body microcomputer 134 increments the ID, and returns the processing to step S301.

In step S303, the body microcomputer 134 determines whether or not the de-focusing amount acquired in step S301 is a value that is equal to or greater than a threshold X (where X<W). When it is determined that the de-focusing amount acquired in step S301 is a value that is equal to or greater than the threshold X, the body microcomputer 134 proceeds the processing to step S307. When it is determined that the de-focusing amount acquired in step S301 is a value that is not equal to or greater (i.e. less) than the threshold X, the body microcomputer 134 proceeds the processing to step S304.

In step S307, the body microcomputer 134 does not display the ranging frame and the de-focusing amount in the focus guide of the ID currently selected, displays the ranging position in a smaller size, and simplifies the display of the ring operation direction. The body microcomputer 134 increments the ID and returns the processing to step S301.

In step S304, the body microcomputer 134 determines whether or not the de-focusing amount acquired in step S301 is a value that is equal to or greater than a threshold Y (where Y<X). When it is determined that the de-focusing amount acquired in step S301 is a value that is equal to or greater than the threshold Y, the body microcomputer 134 proceeds the processing to step S308. When it is determined that the de-focusing amount acquired in step S301 is a value that is not equal to or greater (i.e. less) than the threshold Y, the body microcomputer 134 proceeds the processing to step S305.

In step S308, the body microcomputer 134 does not display the ranging frame in the focus guide of the ID currently selected, and displays each of the ranging position, the ring operation direction, and the de-focusing amount in a small size. The body microcomputer 134 increments the ID and returns the processing to step S301.

In step S305, the body microcomputer 134 determines whether or not the de-focusing amount acquired in step S301 is a value that is equal to or greater than a threshold Z (where Z<Y). When it is determined that the de-focusing amount acquired in step S301 is a value that is equal to or greater than the threshold Z, the body microcomputer 134 proceeds the processing to step S309. When it is determined that the de-focusing amount acquired in step S301 is a value that is not equal to or greater (i.e. less) than the threshold Z, the body microcomputer 134 proceeds the processing to step S310.

In step S309, the body microcomputer 134 does not display the ranging frame in the focus guide of the ID currently selected, and normally displays the ranging position, the ring operation direction, and the de-focusing amount. The body microcomputer 134 increments the ID and returns the processing to step S301.

In step S310, the body microcomputer 134 normally displays all of the ranging frame, the ranging position, the ring operation direction, and the de-focusing amount in the focus guide of the ID currently selected. The body microcomputer 134 increments the ID and returns the processing to S301.

After the processing illustrated in FIG. 3 is executed on all the focus guides in the display, the body microcomputer 134 terminates the processing illustrated in FIG. 3.

As described above, in the present exemplary embodiment, the size or display form of the display of each focus guide is changed according to the de-focusing amount. This leads to a reduction in the amount of information to be displayed on the screen. Even when a plurality of focus guides is displayed simultaneously, it is possible to prevent a vast amount of information from being displayed on the screen, which leads to an improvement in visibility.

Note that in the present exemplary embodiment, four display forms, i.e., display, small display, simple display, and non-display, are selected in a stepwise manner for the ranging frame, ranging position, the ring operation direction, and the de-focusing amount. In a more simplified manner, display and non-display may be switched. One or more of the size, display/non-display, display content, and display form in each focus guide may be changed according to the de-focusing amount.

The focus manual operation is not limited to the operation unit of the ring form, such as the focus ring 168. In this sense, it can be said that the ring operation direction is more generally a focus operation direction.

FIG. 4 is a flowchart illustrating the focus guide display change processing. A control program corresponding to the processing illustrated in FIG. 4 is stored in the ROM 134b of the body microcomputer 134. The CPU 134a of the body microcomputer 134 reads out the control program from the ROM 134b, and develops and executes the control program in the RAM 134c, thereby implementing the processing illustrated in FIG. 4. Like in the example illustrated in FIG. 3, the CPU 134a manages the IDs unique to the respective focus guides, and executes the processing illustrated in FIG. 4 in a loop so that the processing is applied to all the focus guides currently displayed. As illustrated by way of example, each focus guide includes a ranging frame indicating a ranging area, a ranging position indicating coordinates on which the focus guide is performed, a focus ring operation direction for focusing, and a de-focusing amount indicating a deviation amount of the focus.

In step S401, the body microcomputer 134 determines whether or not the number of focus guides currently displayed is equal to or greater than N. When it is determined that the number of focus guides currently displayed is equal to or greater than N, the body microcomputer 134 proceeds the processing to step S402. When it is determined that the number of focus guides currently displayed is not equal to or greater (i.e. less) than N, the body microcomputer 134 proceeds the processing to step S405.

In step S402, the body microcomputer 134 determines whether or not the ring operation direction in the focus guide of the ID currently selected matches the operation direction in which the last operation is performed by the user. When it is determined that the ring operation direction in the focus guide of the ID currently selected matches the operation direction in which the last operation is performed by the user, the body microcomputer 134 proceeds the processing to step S403. When it is determined that the ring operation direction in the focus guide of the ID currently selected does not match the operation direction in which the last operation is performed by the user, the body microcomputer 134 proceeds the processing to step S404.

In step S403, the body microcomputer 134 executes the processing from steps S301 to S310 illustrated in FIG. 3. The body microcomputer 134 increments the ID and proceeds the processing to step S401.

In step S404, the body microcomputer 134 does not display all of the ranging frame, the ranging position, the ring operation direction, and the de-focusing amount in the focus guide of the ID currently selected. The body microcomputer 134 increments the ID and returns the processing to step S401.

In step S405, the body microcomputer 134 normally displays all of the ranging frame, the ranging position, the ring operation direction, and the de-focusing amount in the focus guide of the ID currently selected. The body microcomputer 134 increments the ID and returns the processing to step S401.

After the processing illustrated in FIG. 4 is executed on all the focus guides in the display, the body microcomputer 134 terminates the processing illustrated in FIG. 4.

As described above, the size or display form of the display of each focus guide is changed according to the de-focusing amount. This leads to a reduction in the amount of information to be displayed on the screen. Even when a plurality of focus guides is displayed simultaneously, it is possible to prevent a vast amount of information from being displayed on the screen, which leads to an improvement in visibility. Further, when the number of focus guides to be displayed is small, all the focus guides in the display are normally displayed, thereby preventing the occurrence of disadvantages due to a reduction in the amount of information. In addition, the amount of information can be further reduced by displaying only the focus guide that matches the ring operation direction in which the last operation is performed by the user, which leads to an improvement in visibility.

Figure 5A:
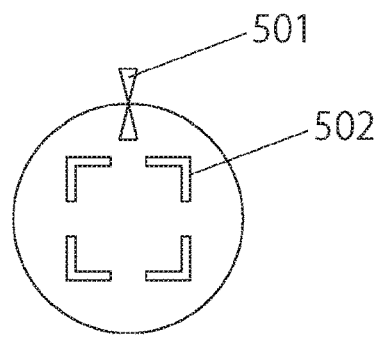
FIGS. 5A to 5C each illustrate an example of a focus guide.
Figure 5B:
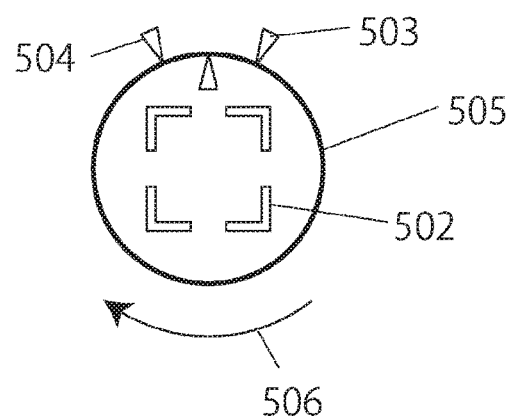
Figure 5C:
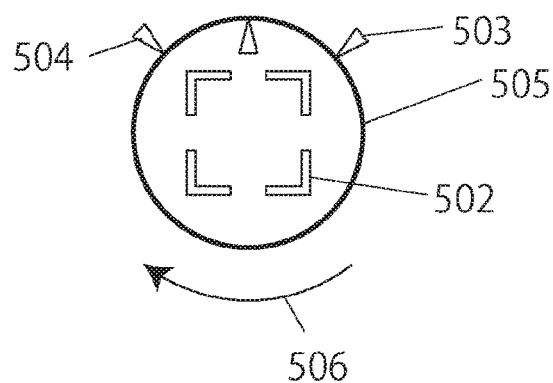

FIGS. 5A to 5C each illustrate an example of the normal display of the focus guide. A frame 502 indicates the ranging area as a ranging area display. Indexes 503 and 504 indicate, as a de-focusing amount display, the de-focusing amount with an angle from a vertex of a circle about the center of the frame 502. A frame 505 indicates, as a ranging position display, coordinates on which the focus guide is performed. An arrow 506 indicates, as a ring operation direction display, the ring operation direction in which the focus ring for focusing is operated. An index 501 indicates the focusing state where the index 503 and the index 504 overlap each other. The color or shape of the index 501 is preferably set to be different from the color or shape of the indexes 503 and 504.

FIGS. 6A to 6D each illustrate a screen transition example in the focus guide display change processing illustrated in FIG. 3. The screen shows a state where a dog, two potted plants, father, mother, and a child, which are arranged in order from behind, are photographed as objects. Assume that focus guides are displayed for all the objects.

Figure 6A:
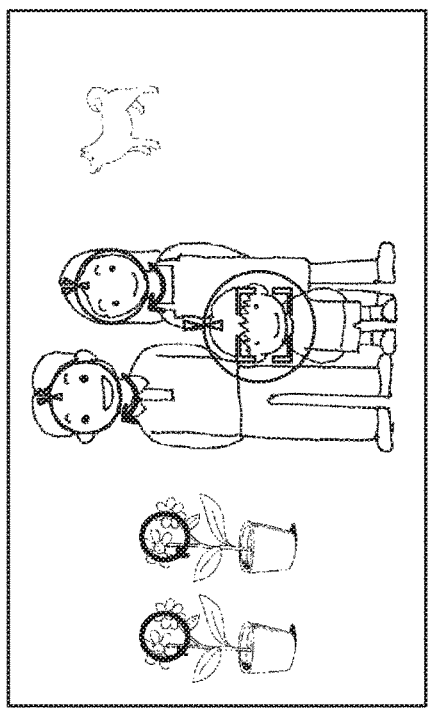
FIGS. 6A to 6D each illustrate a screen transition example.

FIG. 6A illustrates a state where the child located at the frontmost side is in focus. According to the de-focusing amount, the ranging frame in the focus guides for the parents is non-displayed as a result of processing in step S308, and the ranging position, the ring operation direction, and the de-focusing amount are each displayed in a small size. The ranging frame and the de-focusing amount in the focus guides for the two potted plants are non-displayed as a result of processing in step S307; the ranging position is displayed in a small size; and the display is simplified by superimposing the ring operation direction on the ranging position. All of the ranging frame, the ranging position, the ring operation direction, and the de-focusing amount in the focus guide for the dog are non-displayed as a result of processing in step S306.

Figure 6B:
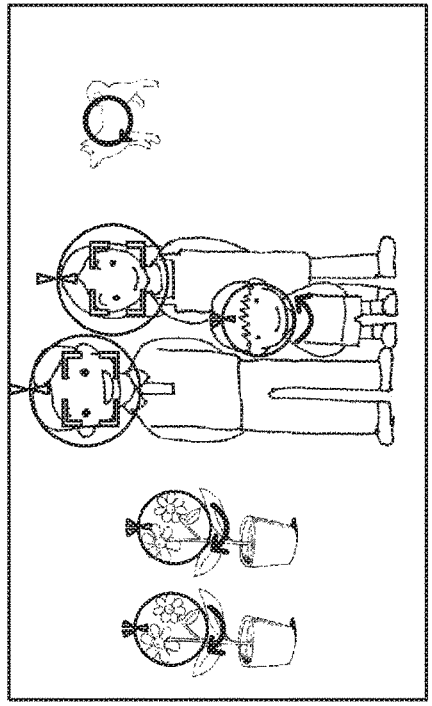

FIG. 6B illustrates a state where the parents are in focus. According to the de-focusing amount, the ranging frame in the focus guide for the child is non-displayed as a result of processing in step S308, and the ranging position, the ring operation direction, and the de-focusing amount are each displayed in a small size. The ranging frame in the focus guides for the two potted plants is non-displayed as a result of processing in step S308, and the ranging position, the ring operation direction, and the de-focusing amount are each displayed in a small size. The ranging frame and the de-focusing amount in the focus guide for the dog are non-displayed as a result of processing in step S307; the ranging position is displayed in a small size; and the display is simplified by superimposing the ring operation direction on the ranging position.

Figure 6C:
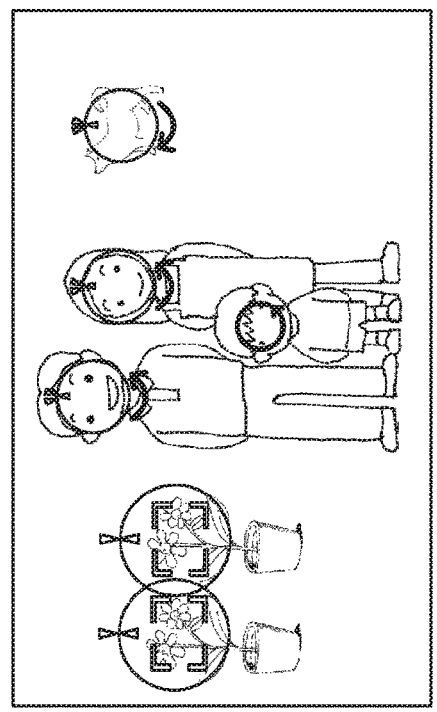

FIG. 6C illustrates a state where the two potted plants are in focus. According to the de-focusing amount, the ranging frame and the de-focusing amount in the focus guide for the child are non-displayed as a result of processing in step S307; the ranging position is displayed in a small size; and the display is simplified by superimposing the ring operation direction on the ranging position. The ranging frame in the focus guides for the parents is non-displayed as a result of processing in step S308, and the ranging position, the ring operation direction, and the de-focusing amount are each displayed in a small size. The ranging frame in the focus guide for the dog is non-displayed as a result of processing in step S308, and the ranging position, the ring operation direction, and the de-focusing amount are each displayed in a small size.

Figure 6D:
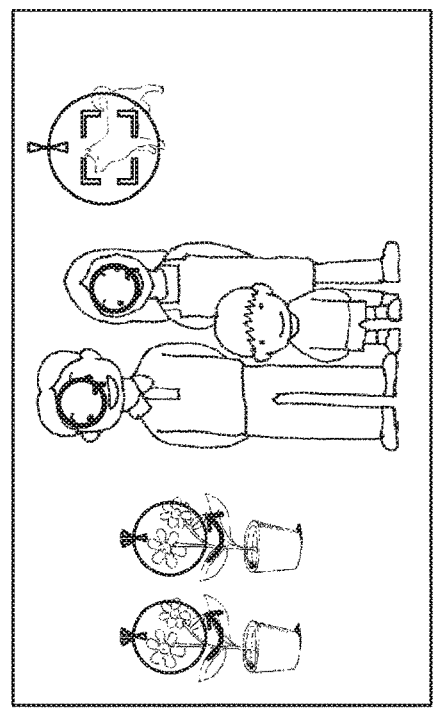

FIG. 6D illustrates a state where the dog is in focus. According to the de-focusing amount, all of the ranging frame, the ranging position, the ring operation direction, and the de-focusing amount in the focus guide for the child are non-displayed as a result of processing in step S306. The ranging frame and the de-focusing amount in the focus guides for the parents are non-displayed as a result of processing in step S307; the ranging position is displayed in a small size; and the display is simplified by superimposing the ring operation direction on the ranging position. The ranging frame in the focus guides for the two potted plants is non-displayed as a result of processing in step S308, and the ranging position, the ring operation direction, and the de-focusing amount are each displayed in a small size.

FIGS. 7A to 7D each illustrate a screen transition example in the focus guide display change processing illustrated in FIG. 4. As illustrated in FIGS. 6A to 6D, the screen shows a state where a dog, two potted plants, father, mother, and a child, which are arranged in order from behind, are photographed as objects. Assume that the number of focus guide displays currently displayed is equal to or greater than N.

Figure 7A:
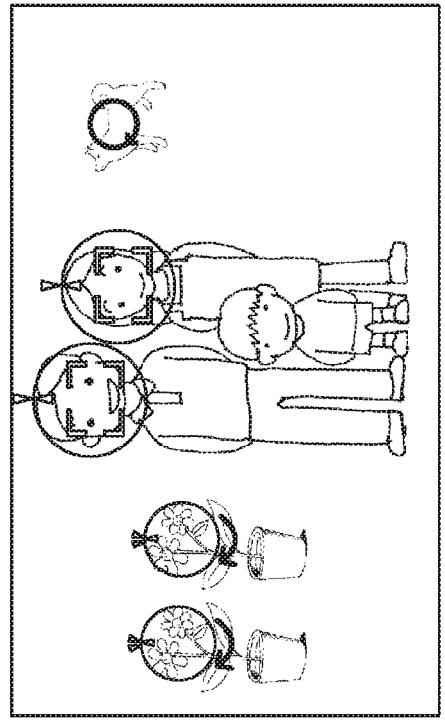
FIGS. 7A to 7D each illustrate a screen transition example.

FIG. 7A illustrates a state where the child located at the frontmost side is in focus after the focus is operated in an infinite direction. The parents, the two potted plants, and the dog are each located in the infinite direction, and thus all the focus guides are displayed as a result of processing in step S402. According to the de-focusing amount, the ranging frame in the focus guides for the parents is non-displayed as a result of processing in step S308, and the ranging position, the ring operation direction, and the de-focusing amount are each displayed in a small size. The ranging frame and the de-focusing amount in the focus guides for the two potted plants are non-displayed as a result of processing in step S307; the ranging position is displayed in a small size; and the display is simplified by superimposing the ring operation direction on the ranging position. All of the ranging frame, the ranging position, the ring operation direction, and the de-focusing amount in the focus guide for the dog are non-displayed as a result of processing in step S306.

Figure 7B:
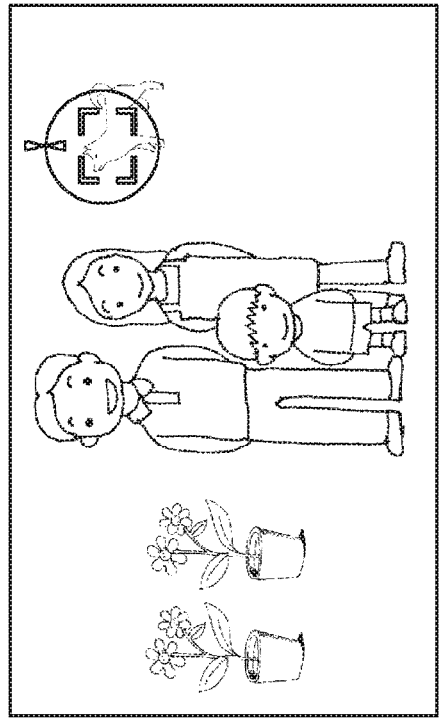

FIG. 7B illustrates a state where the parents are in focus after the focus is further operated in the infinite direction from the state illustrated in FIG. 7A. Since the child is located in the close direction, the focus guide is non-displayed as a result of processing in step S402. Since the two potted plants and the dog are located in the infinite direction, the focus guides are displayed as a result of processing in step S402. According to the de-focusing amount, the ranging frame in the focus guides for the two potted plants is non-displayed as a result of processing in step S308, and the ranging position, the ring operation direction, and the de-focusing amount are each displayed in a small size. The ranging frame and the de-focusing amount in the focus guide for the dog are non-displayed as a result of processing in step S307; the ranging position is displayed in a small size; and the display is simplified by superimposing the ring operation direction on the ranging position.

Figure 7C:
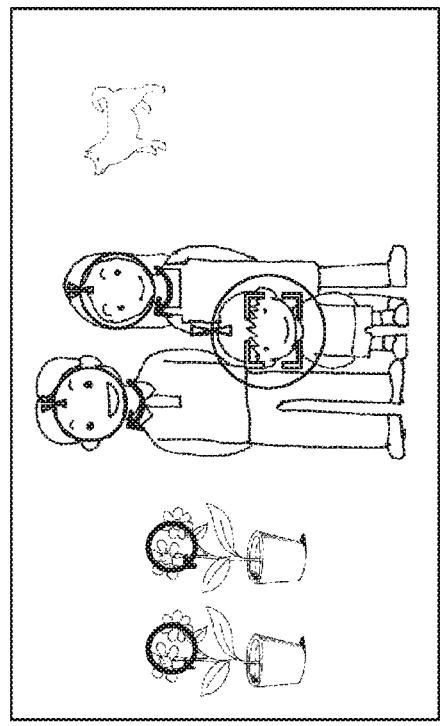

FIG. 7C illustrates a state where the two spotted plants are in focus after the focus is further operated in the infinite direction from the state illustrated in FIG. 7B. Since the child and the parents are located in the close direction, the focus guides are non-displayed as a result of processing in step S402. On the other hand, since the dog is located in the infinite direction, the focus guide is displayed as a result of processing in step S402. According to the de-focusing amount, the ranging frame in the focus guide for the dog is non-displayed as a result of processing in step S308, and the ranging position, the ring operation direction, and the de-focusing amount are each displayed in a small size.

Figure 7D:
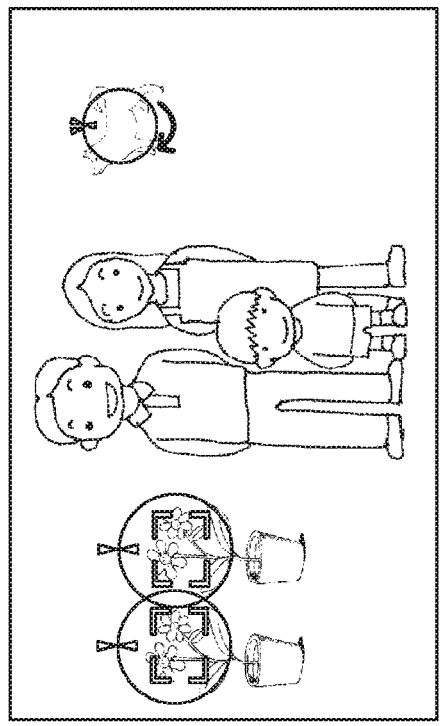

FIG. 7D illustrates a state where the dog is in focus after the focus is further operated in the infinite direction from the state illustrated in FIG. 7C. Since the child, the parents, and the two potted plants are located in the close direction, all the focus guides are non-displayed as a result of processing in step S402.

In this manner, the size or display form of the display of each focus guide is changed according to the de-focusing amount. This leads to a reduction in the amount of information to be displayed on the screen. Even when a plurality of focus guides is displayed simultaneously, it is possible to prevent a vast amount of information from being displayed on the screen, which leads to an improvement in visibility. In addition, the amount of information can be further reduced by displaying only the focus guide that matches the ring operation direction in which the last operation is performed by the user, which leads to an improvement in visibility.

Note that the above-described various control operations that are carried out by the body microcomputer 134 may be carried out by one piece of hardware, or the overall control operation of the apparatus may be carried out in such a manner that the processing is shared among a plurality of pieces of hardware.

The present invention has been described in detail above with reference to the preferred exemplary embodiments. However, the present invention is not limited to these specific exemplary embodiments, and various forms that do not depart from the scope of the invention are also included in the present invention. Furthermore, the above exemplary embodiments are merely examples of the present invention, and the exemplary embodiments can be combined as appropriate.

In the above exemplary embodiments, the case where the present invention is applied to the image pickup apparatus is illustrated by way of example. However, the present invention is not limited to this example, and can be applied to an apparatus that displays focus guides for a plurality of objects with different distances. Specifically, the present invention can be applied to a personal computer, a PDA, a mobile phone terminal, a tablet terminal, a smartphone, and the like.

The processing according to the present invention can also be implemented in such a manner that a program for executing one or more functions of the exemplary embodiments described above is supplied to a system or apparatus via a network or a storage medium, and one or more processors in the system or apparatus read out and execute the program. The processing according to the present invention can also be implemented by a circuit (e.g., an ASIC) that implements one or more functions.

According to the present invention, the size of each focus guide to be displayed in a superimposed manner on a captured image is determined according to the de-focusing amount, thereby reducing the amount of information displayed on the screen. Consequently, it is possible to prevent a vast amount of information from being displayed on the screen even when a plurality of focus guides is displayed, which leads to an improvement in visibility.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-204807 filed Oct. 19, 2016, which is hereby incorporated by reference herein in its entirety.

What is claimed is:

1. A display control apparatus comprising:
an acquisition unit configured to acquire information about a focusing degree of a plurality of focal point detection areas; and
a display control unit configured to control each of the plurality of focal point detection areas to display a focus guide indicating a plurality of pieces of information including the focusing degree in a superimposed manner on a live view image captured by an image pickup unit,
wherein the display control unit performs the control to perform a simple display by displaying a focus guide corresponding to a focal point detection area having a low focusing degree to be smaller than a focus guide corresponding to a focal point detection area having a high focusing degree, or by not displaying at least one of the plurality of pieces of information in the focus guide corresponding to the focal point detection area having the low focusing degree.

2. The display control apparatus according to claim 1, wherein the display control unit displays, as the focus guide, a display item capable of identifying a front focus state or a rear focus state as information about the focusing degree.

3. The display control apparatus according to claim 1, wherein the display control unit displays, as the focus guide, a display item indicating a de-focusing amount as information about the focusing degree.

4. The display control apparatus according to claim 1, wherein the display control unit displays, as the focus guide, a plurality of pieces of information including the focusing degree and positions of each of the focal point detection areas.

5. The display control apparatus according to claim 1, wherein the display control unit displays a focus guide corresponding to a focal point detection area having a focusing degree lower than a first threshold in a second display form, the focus guide in the second display form being simpler than a focus guide in a first display form corresponding to a focal point detection area having a focusing degree equal to or higher than the first threshold.

6. The display control apparatus according to claim 5, wherein the focus guide in the first display form includes a frame indicating the corresponding focal point detection area, an index indicating a focusing degree, and an index indicating a focus operation direction, and
the focus guide in the second display form does not include at least one of the frame indicating the corresponding focal point detection area, the index indicating the focusing degree, and the index indicating the focus operation direction.

7. The display control apparatus according to claim 5, wherein the focus guide in the first display form includes a frame indicating the corresponding focal point detection area, an index indicating a focusing degree, and an index indicating a focus operation direction, and
the focus guide in the second display form does not include the frame indicating the corresponding focal point detection area, and includes the index indicating the focusing degree and the index indicating the focus operation direction.

8. The display control apparatus according to claim 5, wherein the display control unit displays a focus guide corresponding to a focal point detection area having a focusing degree lower than a second threshold in a third display form, the focus guide in the third display form being simpler than the focus guide in the second display form corresponding to a focal point detection area having a focusing degree equal to or higher than the second threshold and lower than the first threshold.

9. The display control apparatus according to claim 8, wherein the focus guide in the first display form is a display form including a frame indicating the corresponding focal point detection area, an index indicating a focusing degree, and an index indicating a focus operation direction,
the focus guide in the second display form is a display form which does not include at least one of the frame indicating the corresponding focal point detection area, the index indicating the focusing degree, and the index indicating the focus operation direction, and
the focus guide in the third display form is a display form which does not include at least two of the frame indicating the corresponding focal point detection area, the index indicating the focusing degree, and the index indicating the focus operation direction.

10. The display control apparatus according to claim 9, wherein the display control unit performs the control not to display a focus guide corresponding to a focal point detection area having a focusing degree lower than a third threshold.

11. The display control apparatus according to claim 1, wherein the display control unit performs the control not to display a focus guide corresponding to a focal point detection area in which an operation direction for causing a focus operation unit configured to manually adjust a focus for further focusing is different from an operation direction in which a last operation is performed on the focus operation unit, regardless of an absolute value of the focusing degree.

12. The display control apparatus according to claim 1, wherein when the number of focal point detection areas is smaller than a predetermined value, the display control unit performs the control to display the focus guide without simplifying the display, regardless of the focusing degree.

13. A method of controlling a display control apparatus, comprising:

acquiring information about a focusing degree of a plurality of focal point detection areas;

controlling each of the plurality of focal point detection areas to display a focus guide indicating a plurality of pieces of information including the focusing degree in a superimposed manner on a live view image captured by an image pickup unit, wherein the controlling includes performing the control to perform a simple display by displaying a focus guide corresponding to a focal point detection area having a low focusing degree to be smaller than a focus guide corresponding to a focal point detection area having a high focusing degree, or by not displaying at least one of the plurality of pieces of information in the focus guide corresponding to the focal point detection area having the low focusing degree.

14. A non-transitory computer readable storage medium storing a program for causing a computer to function as each unit of the display control apparatus according to claim 1.

* * * * *